(12) United States Patent
Schmidt et al.

(10) Patent No.: US 11,440,738 B2
(45) Date of Patent: Sep. 13, 2022

(54) CONTACT PROTECTION APPARATUS FOR COVERING A PINCHING GAP ADJACENT TO A ROLLER

(71) Applicant: Wipotec GmbH, Kaiserslautern (DE)

(72) Inventors: Kay-Eric Schmidt, Mehlingen (DE); Markus Jochen Walter, Trippstadt (DE)

(73) Assignee: Wipotec GmbH, Kaiserslautern (DE)

( * ) Notice: Subject to any disclaimer, the term of this patent is extended or adjusted under 35 U.S.C. 154(b) by 0 days.

(21) Appl. No.: 17/171,807

(22) Filed: Feb. 9, 2021

(65) Prior Publication Data

US 2021/0245961 A1    Aug. 12, 2021

(30) Foreign Application Priority Data

Feb. 11, 2020   (DE) .......................... 102020103493.8

(51) Int. Cl.
  *B65G 39/09*  (2006.01)
  *B65G 39/02*  (2006.01)

(52) U.S. Cl.
  CPC .......... *B65G 39/02* (2013.01); *B65G 2207/40* (2013.01); *B65G 2812/02108* (2013.01)

(58) Field of Classification Search
  CPC ............................... B65G 39/02; B65G 39/09
  USPC .................................. 198/539, 837, 860.3
  See application file for complete search history.

(56) References Cited

U.S. PATENT DOCUMENTS

| | | | |
|---|---|---|---|
| 6,318,545 B1 * | 11/2001 | Ross, II ................. | B65G 15/00 198/497 |
| 7,152,730 B2 * | 12/2006 | Gerke ..................... | B65G 21/00 198/860.3 |
| 7,909,153 B2 * | 3/2011 | Pogue .................. | B65G 41/005 198/315 |
| 9,096,382 B2 * | 8/2015 | Laaksonen ............. | B65G 21/10 |
| 9,522,724 B2 * | 12/2016 | Dixon ....................... | B64C 1/20 |
| 10,246,265 B2 * | 4/2019 | Schnitkey .............. | B65G 39/12 |
| 10,287,100 B2 * | 5/2019 | Weisfelner ............... | B64D 9/00 |
| 2006/0144679 A1 | 7/2006 | Wier et al. | |

FOREIGN PATENT DOCUMENTS

| | | |
|---|---|---|
| CN | 201442753 U | 4/2010 |
| CN | 205010883 U | 2/2016 |
| CN | 105564889 A | 5/2016 |
| CN | 207595834 U | 7/2018 |
| CN | 209321810 U | 8/2019 |
| DE | 39 40 786 C1 | 5/1991 |
| DE | 10 2016 125 77 A1 | 6/2018 |
| EP | 1 329 399 A2 | 7/2003 |
| EP | 1329399 A2 | 7/2003 |

(Continued)

OTHER PUBLICATIONS

DE 10 2020 103 493.8 German Office action dated Oct. 15, 2020.
(Continued)

*Primary Examiner* — Douglas A Hess
(74) *Attorney, Agent, or Firm* — The Culbertson Group, P.C.

(57) ABSTRACT

A contact protection structure can be positioned on a belt body to prevent a pinching gap, where the belt body presents a conveyor belt deflected by a roller, and where a roller holder supporting the roller and attachable to the belt body also supports the contact protection structure.

13 Claims, 4 Drawing Sheets

(56) References Cited

FOREIGN PATENT DOCUMENTS

| | | |
|---|---|---|
| EP | 3 020 659 A1 | 5/2016 |
| EP | 3 343 188 A2 | 7/2018 |
| FR | 2 842 793 A1 | 1/2004 |
| JP | S56122713 A | 9/1981 |
| JP | S61501555 A | 7/1986 |
| JP | 2017201211 A | 11/2017 |

OTHER PUBLICATIONS

EP 21 15 6093.3 Extended European Search Report dated Jul. 6, 2021.
Chinese Patent Office action dated Apr. 1, 2022 in Chinese patent application 202110186455.7.
Japanese Patent Office action dated May 31, 2022 in Japanese patent application 2021-016634.

\* cited by examiner

CONTACT PROTECTION APPARATUS FOR COVERING A PINCHING GAP ADJACENT TO A ROLLER

TECHNICAL FIELD OF THE INVENTION

The present invention relates to contact protection devices for positioning on a belt conveyor, designed to prevent the occurrence of a pinching gap which would pose a hazard for human limbs during operation of the belt conveyor.

BACKGROUND OF THE INVENTION

On conveyor belt systems there is a risk of, for example, the operator's finger or hand, or an article of clothing such as a tie, scarf or sleeve, being drawn into a pinching gap and crushed. The pinching gap can occur, for example, between a stationary and a moving part, especially a rotating part. A pinching gap may also occur between a product transported by the conveyor belt system and a stationary or moving part of the conveyor belt system, such as in particular a roller or belt. In the context of this application, a pinching gap should therefore be understood as a gap that poses a hazard for the operation of a conveyor belt system, and which is to be reduced by a contact protection device to a permissible degree corresponding to applicable safety standards.

The (subsequent, if necessary) mounting of a contact protection onto a conveyor belt system entails considerable effort (in terms of time and material). In addition, losable fixing screws are often used, which is undesirable when transporting unpackaged foodstuffs in the food industry or in the pharmaceutical sector. If the contact protection is removed during the lifetime of the machine, for example when replacing a defective conveyor belt or during (possibly frequent) cleaning, then the contact protection could be forgotten or even willfully omitted before recommissioning, with the result that the original operational safety of the transport system is no longer guaranteed.

Standard contact protection measures on the belt body of a conveyor belt system are established to a greater or lesser depth in the longitudinal direction or conveying direction X, so that a larger or smaller gap must remain at the transition between two consecutive conveyor belts, if contact is to be safely avoided. This is especially the case with weighing instruments, especially automatic weighing instruments, because the weighing platform, and thus the weighing conveyor belt, must not have any interfering shunting effect on adjacent "mainland areas," that is, adjacent conveyor belt systems or other structures.

In order to be able to transport even small (short) products across the transition gap bell tween two consecutive conveyor belts, ideally without any jolts causing interference on the platform however, the gap length must be as short as possible in the transport direction. Consequently, the contact protection structure must be as short as possible in the transport direction, and ideally not take up any space in the transport direction.

The permissible residual gap in place of the pinching gap between the contact protection structure and the rotating part or conveyor belt must, according to the safety standards, generally be no more than a few millimetres, as otherwise fingers could be drawn in. Less than or equal to 5 mm is preferred.

SUMMARY OF THE INVENTION

An object of the invention is therefore to offer a simple contact protection structure which overcomes the aforementioned disadvantages and ensures the operational safety of a conveyor belt system in terms of preventing a pinching gap.

The invention is based on the discovery that an effective contact protection structure can be developed by attaching an element forming providing the contact protection to a roller holder or even forming it in one piece with the roller holder. Thus the contact protection structure can become an integral part of the roller holder. Accidental or deliberate start-up of the conveyor belt without the contact protection structure is thus impeded or prevented.

The contact protection structure serves to cover a pinching gap, which could occur bell tween two components during operation of a belt conveyor, where one of the two components is the conveyor belt of a belt conveyor. Such a belt conveyor extends in a conveying direction X, a transverse direction Y running orthogonally to this and a vertical direction Z running orthogonally to both these directions. The conveyor belt is deflected by means of a roller, which rotates around a roller axis running in the transverse direction Y and is held by a roller holder. The roller holder is mounted on the belt body of the belt conveyor in a roller holder operating position to hold the roller in this position. In order to change the conveyor belt or alter the belt tension, for example, the roller holder can be temporarily detached from the belt body and even removed. Subsequent recommissioning is naturally only possible once the roller holder is attached to belt body again.

According to the invention the contact protection structure is formed in one piece with the roller holder (one-piece solution). If the roller holder is then temporarily removed from the belt body and subsequently reinstalled, the contact protection mounted to the roller holder is also reinstalled simultaneously. As the belt conveyor is only operational with the roller holder mounted, and at the same time the contact protection is also correctly fitted, the advantage is that start-up of the belt conveyor cannot occur without the contact protection.

The pinching gap which must be prevented during operation can occur in particular at the point where the roller deflects the conveyor belt (generally by 180°). During deflection, the conveyor belt has an outer radius, in relation to the roller axis, which results from the radius of the roller plus the thickness of the conveyor belt. This outer radius is also referred to as "belt radius" in the following. A pinching gap could occur in the area which connects to the outside of the belt radius in the radial direction, for example between the conveyor belt and a product which is being drawn in on the conveyor belt deflected by the roller. The conveyor belt section which is located at the height of the roller axis during deflection around the roller, represents the farthest extension of the conveyor belt in the X-direction and will be referred to as "belt end" in the following.

For effective contact protection, it is necessary to arrange a protective element in the pinching gap as part of the contact protection structure. This protective element fills out the potential pinching gap or reduces it to the permissible measurement of the relevant safety standards. To achieve this, the protective element extends radially outside the belt radius in the transverse direction Y into the pinching zone. It thus fills out the space of the potential pinching gap and instead forms, between itself and the conveyor belt deflected by the roller, a much smaller residual gap G permitted by the technical standards, which is sufficient for trouble-free operation of the conveyor belt and at the same time safely prevents human limbs, clothing etc. from being drawn in.

The protective element can extend along a circular arc running around the roller axis, with one section facing the conveyor belt. This gives the protective element a certain stiffness and stability. At the same time such a protective element, which partially surrounds the conveyor belt along the roller in the peripheral direction in the manner of a casing or housing, protects the conveyor belt from unwanted contact, soiling, abrasion, wear or even damage. The casing or housing can also revolve around the belt end or extend through an X-Y plane enclosing the roller axis. In this case the protective element extends slightly further in the X-direction than the conveyor belt deflected by the roller.

In this case, however, the advantage of the particularly good protection of the conveyor belt is offset by a greater minimum distance which must be observed between the belt body and an adjacent additional belt body in conveying direction X for example, as the protective element also extends at the height of the roller axis between the belt body and the adjacent additional belt body. The two belt bodies can therefore not be consecutively arranged as closely as desired in the X-direction, due to the protective element located in between, resulting in an additional, disadvantageous increase in the transfer gap between two consecutively positioned belt bodies. (The transfer gap between two consecutive belt bodies occurs at the two adjacent belt ends due to the roller curvature and the conveyor belt following this curvature, so that the conveying plane of the two consecutive belt bodies is interrupted by a "gusset".) Depending on the roller diameter in relation to the package dimensions, there is a risk of the product tipping into the transfer gap during transfer. This makes controlled further transport much more difficult.

To avoid this problem, an alternative embodiment of the protective element therefore provides that the protective element does not extend at the height of the roller axis, but only above and/or below this plane. The belt end is then not covered by the protective element in the X-direction. This makes it possible to arrange two consecutive belt bodies in conveying direction X or their belt ends at the smallest possible X-distance from each other, in order to keep the transfer gap as small as possible. As the protective element must also not protrude into the conveying path above the conveyor belt, it lies both outside the belt radius and in an area which, overlooking a cross-section perpendicular to the roller axis, a) in vertical direction Z is limited by an X-Y plane containing the roller axis and a further parallel plane lying above or below this plane at the same distance as the belt radius' (where the plane positioned above represents the conveying plane formed by the upper side of the conveyor belt), and b) in conveying direction X lies on the side, facing the belt end, of a Y-Z plane containing the roller axis.

This does not preclude the protective element from extending beyond the belt end above or below the roller axis in conveying direction X. In this case the protective element can simultaneously also form a contact protection structure for a further belt body adjacent to the belt body in conveying direction X. In addition to the previously described residual gap G, which the protective element then forms with the conveyor belt of its "own" belt body, it can also form a comparable small gap with conveyor belt of the adjacent belt body, making the additional arrangement of a contact protection structure for the adjacent belt body superfluous. The protective element for this is preferably symmetrically formed relative to a Y-Z plane containing the belt end. In the case of a conveyor belt system belonging to a weighing instrument, such a protective element is preferably arranged on the incoming or outgoing belts before or after the weighing instrument, and not on the belt body of the weighing belt itself, in order to reduce the preload and thus reduce transient responses of the weighing instrument.

Alternatively, it may be advantageous to provide a belt body with its own contact protection. Several comparable belt bodies can then be consecutively arranged in the conveying direction, without the protective element of one contact protection also being responsible for eliminating the risk of pinching on the adjacent belt body. The consecutive arrangement of such "autonomous" belt bodies is then easier. In this case the protective element preferably does not extend beyond the belt end in conveying direction X.

In order to further reduce the transfer gap, some embodiments of the invention provide that a section of the protective element serving as a supporting surface forms part of the conveying plane, in order to make the transfer and further transport of the products from the belt body to an adjacent conveyor as smooth as possible. As a result the product conveyed over the roller is additionally supported in the area of the transfer gap, while the conveyor belt is already following the curvature of the roller and is guided out of the conveying plane. The supporting surface extends in the X-Y direction in the conveying plane and "receives" the product coming from the conveyor belt virtually along its length in the X-direction. This has the advantage of preventing products from tipping into the transfer gap during transfer.

In order to also be able to use the contact protection according to the invention on belt bodies with different widths of conveyor belts, some embodiments of the invention provide that the protective element of the contact protection may be modularly extended in the Y-direction. Individual modules can be plugged together or otherwise attached to each other in the Y-direction (screwed together, locked in place, plugged in), in order to achieve the necessary overall width in the transverse direction Y, required to completely cover a possible pinching gap.

According to some embodiments of the invention, the contact protection structure is symmetrically formed in an X-Y plane containing the roller axis. It can thus (rotates by 180° if necessary) either be fixed on both sides in transverse direction Y to the roller holder or to the frame of a belt body, so that there is no need to fabricate and stock a separate contact protection for both cases. Expediently, suitable fastening means on the frame of a belt body are also symmetrical or in any case designed to hold a symmetrically shaped contact protection. By using such "non-variable parts", component diversity can be advantageously reduced, which is also favourable for storage costs.

In order to be able to arrange the protective element as part of the contact protection structure on the belt body, a retaining section of the contact protection structure may extend laterally next to the roller held by the roller holder, in order to support the protective element, which fills out the pinching gap and reduces it to the residual gap, beyond the belt radius. At the same time the retaining section may also serve to fix the contact protection structure to the roller holder. The retaining section can also serve to simultaneously fix the roller holder to a frame of the belt body.

In some implementations, the protective element extends, starting from the aforementioned retaining section, in transverse direction Y, freely projecting over the conveyor belt guided by the roller, preferably with a constant cross-section. As in this case the protective element is only fixed to one side of the retaining section (or is joined to it there in one piece), on the side of the roller opposite the retaining section in transverse direction Y the conveyor belt can if necessary be removed from the roller in transverse direction Y, without this being impeded by a section of the contact protection. This considerably simplifies changing the conveyor belt or removing the contact protection together with the roller holder from the belt body.

A belt body according to the invention comprises at least one contact protection structure according to the invention of the type described above. The contact protection structure is part of the roller holder. The roller holder for its part is detachably fixed to the belt body, so that in the event of temporary disassembly of the roller holder, the contact protection structure is removed at the same time and when the roller holder is reinstalled prior to recommissioning, the contact protection structure is also simultaneously fixed to the belt body again. This has the advantage of preventing inadvertent start-up of the belt conveyor without the contact protection structure in place.

The belt body preferably includes a frame for fixing the roller holder. This frame extends between two rollers spaced apart from each other in conveying direction X, which serve for deflecting the conveyor belt, and for driving it if necessary. One section of the frame preferably also extends between the upper and the lower run of the conveyor belt. The frame can serve to support the conveyor belt in the area between the two rollers in vertical direction Z. In particular the frame serves to arrange both rollers at a predefined distance, preferably adjustable to each other, in the X-direction, at which the rollers are fixed to the frame with their respective roller holder.

For fixing the roller holder to the frame, the frame can, for example, contain a recess in transverse direction Y. The recess has one or more contact faces, which interact with a section of the roller holder inserted into the recess and thus define the position of the roller holder relative to the frame in relation to one or more spatial directions X, Y, Z. The roller holder can preferably be inserted into the frame recess in an insertion movement in transverse direction Y, thus engaging the roller holder with the frame. For example, the roller holder could have a projection formed in transverse direction Y, which can be inserted into a complementarily formed recess in the frame in transverse direction Y, i.e. from the side of the belt body. The roller holder can also have stop surfaces, which interact with the frame and define the Y-position of the roller holder relative to the frame.

In some embodiments, a recess provided in the belt body frame for mounting the roller holder is designed to hold the roller holder in different X-positions relative to the belt body and frame. Such a recess could be formed using the tongue-and-groove principle, through a slot extending in longitudinal direction X, into which a section of the roller holder can be inserted so that the section together with the roller holder can be moved along the slot in the X-direction. This allows the X-position of the roller held by the roller holder to be adjusted relative to the belt body, in order to achieve a desired belt tension, for example. With a suitable shape and direction of the recess, the roller or roller axis retains its Y-height essentially unchanged, irrespective of the displacement position, and so executes a purely translational movement without tipping.

In these embodiments, using suitable fastening means, for example a clamping screw interacting with the roller holder and the frame, the roller holder can be fixed in the selected X-position on the belt body using latching or other locking means. The fastening means are preferably operable without tools, for example a wing nut or manually operable engaging mechanism. The tongue-and-groove principle described in the example of the slot can naturally also be implemented in the sense of a kinematic inversion, through the fact that the recess is provided on the roller holder and interacts with a suitable projection on the frame of the belt body. Other common fastening means, known as such to the specialist, with which two components can be fixed together in a selectable relative position, can also be considered in principle for mounting the roller holder to the belt body.

The roller holder in some embodiments may be fixed to the frame without losable parts, for example using a clamping or engaging mechanism, whose components always remain connected to the frame or roller holder. This prevents the possibility of losable small parts, which may be difficult to detect, entering the conveyed products, especially food products, as foreign objects.

The roller holder in accordance with the invention may be designed to carry or support a roller on one side. This means that a section forming the roller axis (for example a cylindrical pin) is only connected to the roller holder on one side of the roller, while the roller axis is not supported on the other side. This simplifies mounting of the roller, and a roller change is also easier to perform. The section forming the roller axis projects out slightly in transverse direction Y, and the roller can be pushed onto this section in transverse direction Y and secured with suitable fastening means if necessary.

The contact protection structure formed in one piece with the roller holder can be formed with the roller holder in a number of ways, in relation to an X-Z plane centrally dividing the roller (in the following referred to as "roller plane"). In some embodiments, a retaining section, connectable to a belt body, extends on one side of the roller plane in conveying direction X towards the belt end, where the protective element extending in transverse direction Y connects. The retaining section may also serve as roller holder, with a pin projecting from the retaining section in transverse direction Y forming the roller axis and serving to hold a roller which can be attached to the pin. At the same time the retaining section partially or completely covers the roller on this side of the roller plane. On the other side of the roller plane opposite the retaining section, the roller or protective element of the contact protection is "open" in transverse direction Y so that, in particular, the conveyor belt can be removed from the roller in this direction if necessary. The retaining section in this embodiment, with one section facing away from the belt end, serves for fixing to the belt body, while the section extending towards the belt end carries the roller on the one hand, and on the other hand also forms the contact protection structure with at least one protective element in the area of the belt end. By detaching the retaining section from a belt body (for example for maintenance purposes or to adjust the belt tension), the roller holder and the roller together with the contact protection are thus detached and removed if necessary, in which case the protective element does not change its relative position to the roller. After refitting the retaining section with roller and protective element to a belt body, the protective element is unchanged and automatically positioned at the correct distance relative to the roller and belt radius. The arrangement of retaining section, roller holder and protective element may be formed in one piece, for example from a stable plastic or metal, particularly aluminium or stainless steel.

Some embodiments provide that a first retaining section extends as roller holder on a first side of the roller plane, while a second retaining section connectable or firmly attached to this first retaining section extends as part of the contact protection structure on the second side of the roller plane to the belt end, where it supports the at least one protective element. The first retaining section supporting the roller can partially or completely cover the roller on the first side of the roller plane. The second retaining section lying on the second side of the roller plane can also partially or completely cover the roller on this second side, projecting over the roller beyond the belt radius at least at one point, in order to support the protective element projecting over the belt surface in transverse direction Y. Once again in this variant, the first retaining section serving as roller holder can be formed in one piece with the second retaining section or contact protection and its protective element, so that recommissioning of the belt body is only possible with a correctly provided contact protection.

In some embodiments, the contact protection structure according to the invention, also if arranged on a belt body, is designed so that it is "open" to one of the two roller sides, so that a conveyor belt can be detached and removed from the roller in transverse direction Y (to reduce the belt tension, the roller holder fixable to the frame of the belt body can be loosened or even completely removed if necessary).

The one-piece design of contact protection and roller holder offers the particular advantage that no "additional" fixing is required between these two parts. Fastening means that could get lost and enter the conveyed products are thus advantageously avoided. In addition, the number of individual parts is reduced, and the assembly and maintenance of a belt conveyor with such a contact protection structure will be simpler.

The contact protection structure according to the invention has been described above using a belt body, where a conveyor belt is deflected by a roller and the contact protection in the area of the deflection reduces a pinching gap to the permissible residual gap. However, these characteristics and considerations also apply likewise for other circulating conveying means, for example chains, (narrow) belts, round belts, profiled belts etc. The contact protection can advantageously also be used for inspection equipment, such as e.g. weighing instruments, metal detectors, X-ray equipment or other measuring equipment, which are designed for the transport of products.

These and other advantages and features of the invention will be apparent from the following description of representative embodiments, considered along with the accompanying drawings.

DESCRIPTION OF REPRESENTATIVE EMBODIMENTS

Figure 1:
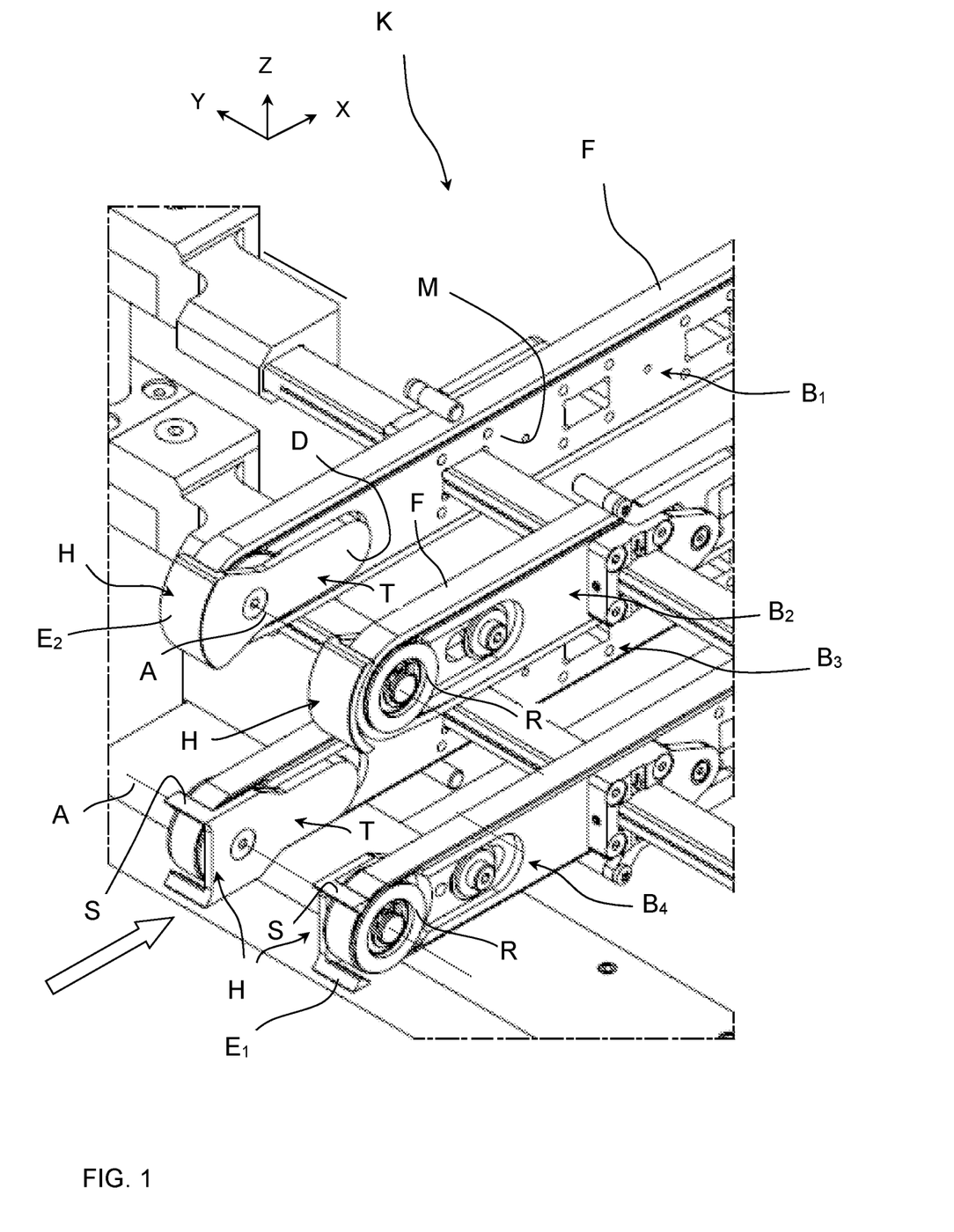
FIG. 1 shows a perspective view of four belt bodies in a conveyor belt system.

The belt conveyor K shown in FIG. 1 comprises four belt bodies in total $B_1$-$B_4$, which extend in a conveying direction X and are arranged on top of each other in vertical direction Z and next to each other in transverse direction Y, in order to clamp products between the belt bodies placed on top of one another $B_1$, $B_3$ and $B_2$, $B_4$ and convey them in conveying direction X, indicated by an arrow. Each belt body is essentially formed by a frame M, which is specified in more detail in FIG. 1 only for belt body $B_1$. Each belt body also includes a conveyor belt F, which is deflected by a roller R at a (in relation to the conveying direction X) rear end of the belt body B (a roller arranged at the front end of each belt body with the same function and preferably also with contact protection is not shown, to enable a better overview). Each roller R can be rotated around a roller axis A running in transverse direction Y.

The conveyor belts F of the upper two belt bodies $B_1$, $B_2$ rotate in the opposite direction to the opposing lower two belt bodies $B_3$, $B_4$ in vertical direction Z, so that a product coming in conveying direction X (from bottom left in FIG. 1) is drawn in between the belt bodies B and can be conveyed onward by them in conveying direction X.

Each belt body B carries a contact protection structure H at its rear end. Each contact protection structure comprises one or two protective elements $E_1$, $E_2$ (also see FIGS. 2 and 3), which extend in transverse direction Y at a short distance from the conveyor belt F deflected by the roller R. As a result, they form a (shown in FIG. 3 in particular) residual gap G, which is designed to be smaller than human limbs, particularly fingers, in compliance with standard requirements. The contact protection structure H prevents a finger, for example, from entering the pinching gap, which is formed in the area of a roller R between the conveyor belt F and a product drawn in by conveyor belt K. The contact protection structure H protrudes with its protective element $E_1$, $E_2$ into this potential pinching gap and fills it out.

The contact protection structure H of the upper belt body $B_1$ comprises a shell-shaped protective element $E_2$, which is moulded in one piece to a retaining section D. The retaining section D extends laterally past the roller R in conveying direction X and is fixed to an end facing away from protective element $E_2$ on the frame M of the belt body $B_1$. The roller R (difficult to see on the first belt body) is supported by retaining section D, also serving as roller holder T, and positioned relative to the frame M of the belt body $B_1$. The contact protection structure H, formed in one piece with the roller holder T, can thus be removed from the frame M in the (negative) transverse direction Y, so to the bottom right in FIG. 1, or inserted in the reverse direction. (The arrangement of the contact protection structure H on the second belt body $B_2$ opposite the first belt body $B_1$ in the transverse direction is designed so that it is mirror-symmetrical to the first belt body, and the above statements in relation to the first belt body $B_1$ apply equally). The two lower belt bodies $B_3$, $B_4$, which are again formed mirror-symmetrically to each other in relation to their respective contact protection, also support a contact protection structure H at their rear end. Each contact protection structure presents two flange-like protective elements $E_1$ spaced apart from one another in vertical direction Z, and freely projecting in transverse direction Y. Their properties will be explained in more detail below. Furthermore, the contact protection structure H of the lower belt bodies $B_3$, $B_4$ is designed to be similar to that of the upper belt bodies $B_1$, $B_2$. The protective elements $E_1$ of each contact protection H are accordingly fixed to the frame of the respective belt body $B_3$, $B_4$ via a retaining section simultaneously serving as roller holder T (and not specified in more detail here).

Figure 2:
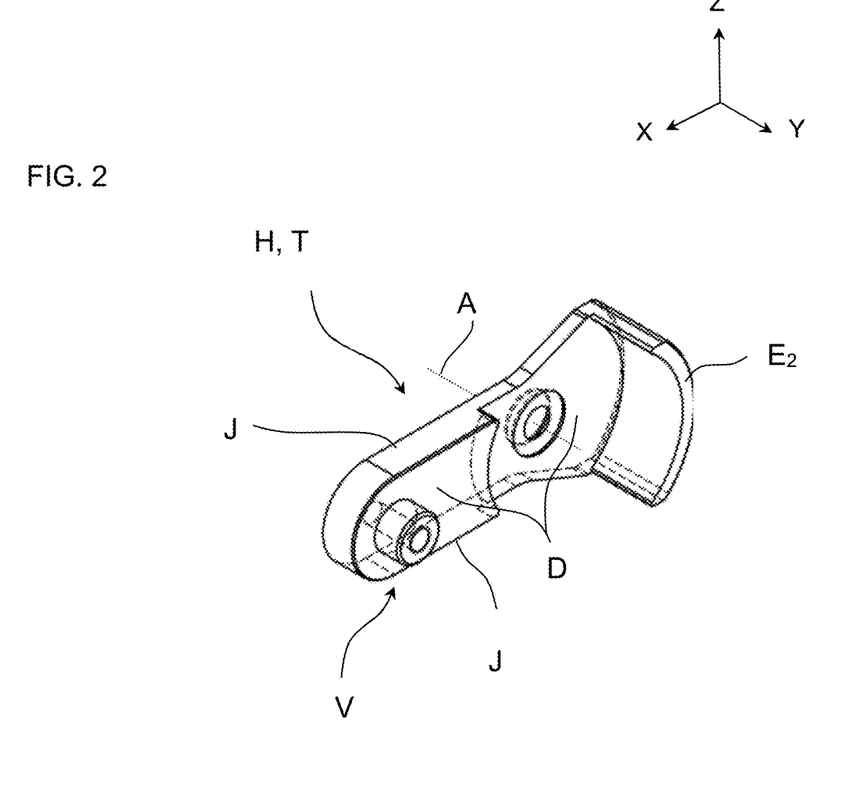
FIG. 2 shows a contact protection structure according to the invention in a first design.

FIG. 2 shows a simplified perspective representation of a one-piece contact protection structure H according to the invention, as it is provided in FIG. 1 on the two upper belt bodies $B_1$, $B_2$. A shell-shaped protective element $E_2$ extends along a circular arc around the roller axis A of a roller R still to be accommodated by the protective element. This protrudes freely in transverse direction Y, starting from a retaining section D extending in the X-direction. The width of the protective element $E_2$ is designed so as to completely cover the roller R, still to be inserted, and the belt F in transverse direction Y. The retaining section D is simultaneously roller holder T and presents a recess roughly corresponding to the roller diameter in the area of roller axis A, for accommodating the roller. At its end facing away from the protective element, the retaining section D is equipped with connection means V, with which it can be fixed to the frame M of a belt body B.

In the area of the connection means V the retaining section D is equipped with two guide surfaces (first positioning surfaces) J parallel to each other. A recess provided in the frame of a respective belt body presents two stop surfaces (second positioning surfaces) W (FIG. 4) arranged complementarily to the two guide surfaces J, and opposite one another in vertical direction Z. These precisely guide the retaining section D in inserted condition relative to the frame M in conveying direction X and at the same time enable the adjustment of an X-position of the retaining section D relative to the frame. The roller R to be accommodated by the retaining section D can thus be moved along frame M into an X-position suitable for the necessary belt tension and be fixed using the connection means V. The protective element $E_2$ formed in one piece on the retaining section D also executes this movement, so that the distance of the protective element $E_2$ from the belt F supported by the roller R and from the roller axis A remains unchanged.

Figure 3:
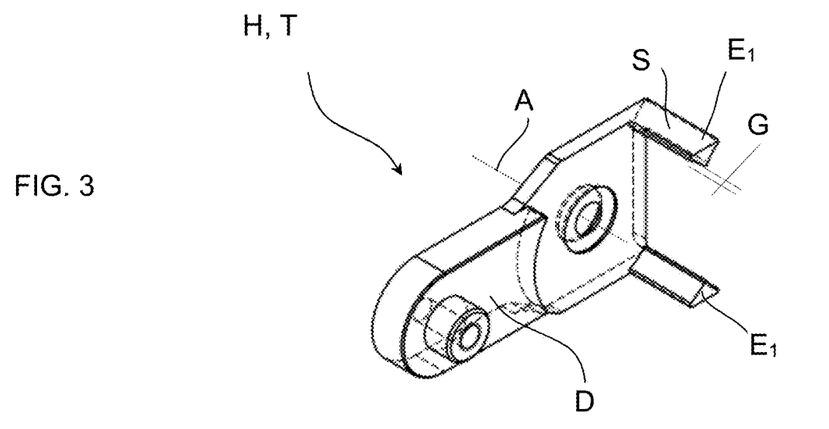
FIG. 3 shows a contact protection structure according to the invention in a second design.

FIG. 3 shows the contact protection structure H, also one-piece, arranged on the lower belt bodies $B_3$, $B_4$ in accordance with FIG. 1. While the statements about the design and function of the retaining section D should be understood similarly to those relating to FIG. 2, the contact protection structure differs in respect of the design of its protective elements. Two protective elements $E_1$ extend, spaced apart from one another in vertical direction Z, parallel to each other and freely projecting from the retaining section D, in transverse direction Y. Here too the Y-width of the protective elements is selected according to the Y-width of the roller R to be accommodated by the retaining section D and of the conveyor belt F supported by it. The space between the upper and lower protective element $E_1$ remains free, so that the roller R or at least the conveyor belt F deflected by it can project into or through this space. The residual gap G previously described is formed between the conveyor belt F not shown in FIG. 3 and deflected by the roller R and the surface of the protective element $E_1$ facing the roller axis A.

Each protective element $E_1$ presents a surface serving as supporting surface S, which extends in an X-Y-plane. The position of the supporting surfaces S relative to the roller axis A is selected so that a contact protection structure H arranged on the belt body creates, with the supporting surface S of the upper protective element $E_1$, an extension of the conveying plane, which is defined by the surface of the conveyor belt F along the belt body B. The distance from the supporting surfaces S to the roller axis in vertical direction Z, defined as belt radius N, results from the sum of roller radius and Z-thickness of the conveyor belt F (also see FIGS. 4 and 5).

However, it is also possible to omit the function of the supporting surfaces, as products could possibly jam with a protective element reaching up to the height of the conveying plane. In this case the position of the surface S in the Z-direction is deliberately designed to be slightly lower than that of the conveying plane, so that the products can largely move contact-free across the protective element and this acts purely as a contact protection.

The contact protection according to FIGS. 2 and 3 is formed symmetrically to an X-Y-plane containing the roller axis A. As FIG. 1 shows, such a contact protection is advantageously designed to be inserted into the frame M of a belt body, either from one or (then turned by 180°) from the other side and in or opposite to transverse direction Y, wherein the freely projecting protective element then extends in or opposite to transverse direction Y.

Figure 4:
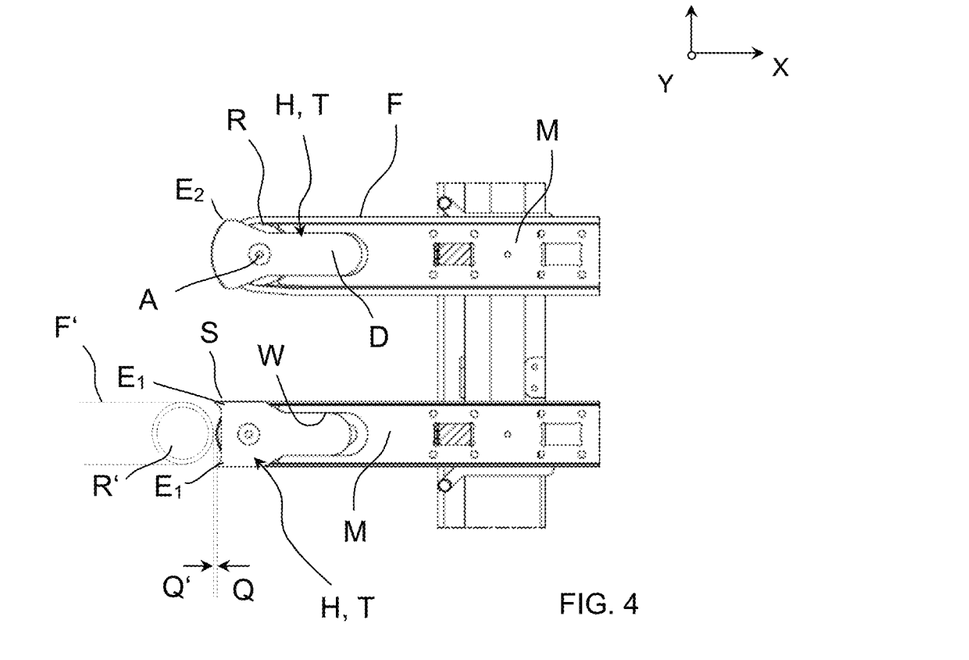
FIG. 4 shows the contact protection structure variant according to FIG. 2 mounted to a belt body.
Figure 5:
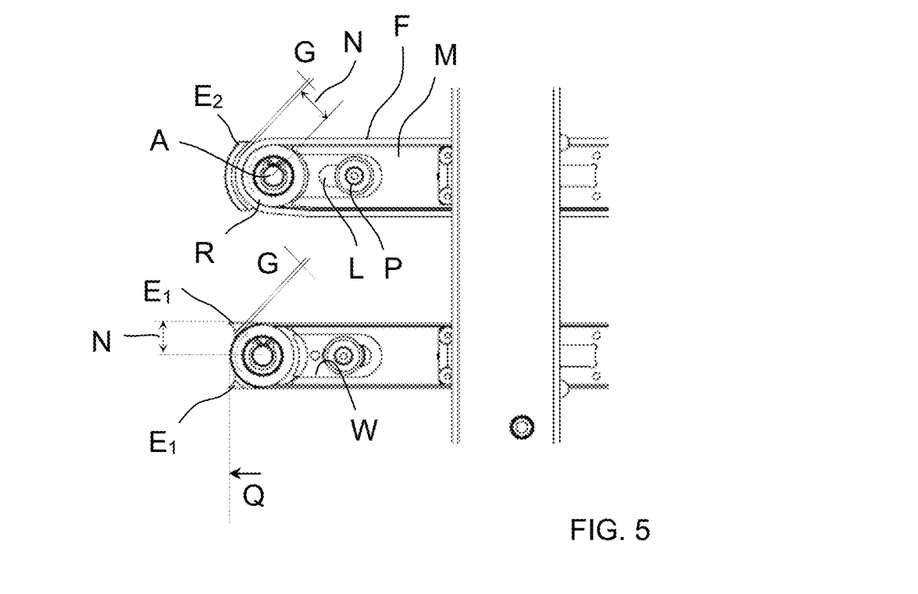
FIG. 5 shows the contact protection structure variant according to FIG. 3 mounted to a belt body.

FIGS. 4 and 5 show a simplified side view (facing in transverse direction Y) of the arrangement, already shown in FIG. 1, of the different contact protections or protective elements $E_1$ and $E_2$. It can be seen that the shell-shaped protective elements $E_2$ extend in the X-direction beyond the rear belt end Q and the roller R also rotates at the height of the roller axis A. As a result, in addition to a contact protection, a particularly good protection of the roller R against damage or soiling is also achieved.

A contact protection structure H, which is equipped with protective elements of type $E_1$ instead, enables the arrangement of a further belt body connecting to the belt body in the X-direction (with a roller R', a conveyor belt F' and a belt end Q') in such a way that the then adjacent belt ends Q, Q' of both belt bodies are positioned as close to each other as possible, in order to keep a transfer gap as small as possible. The conveyor belt F with its belt end Q projects into or through the space formed between the protective elements $E_1$ in the X-direction.

Figure 6:
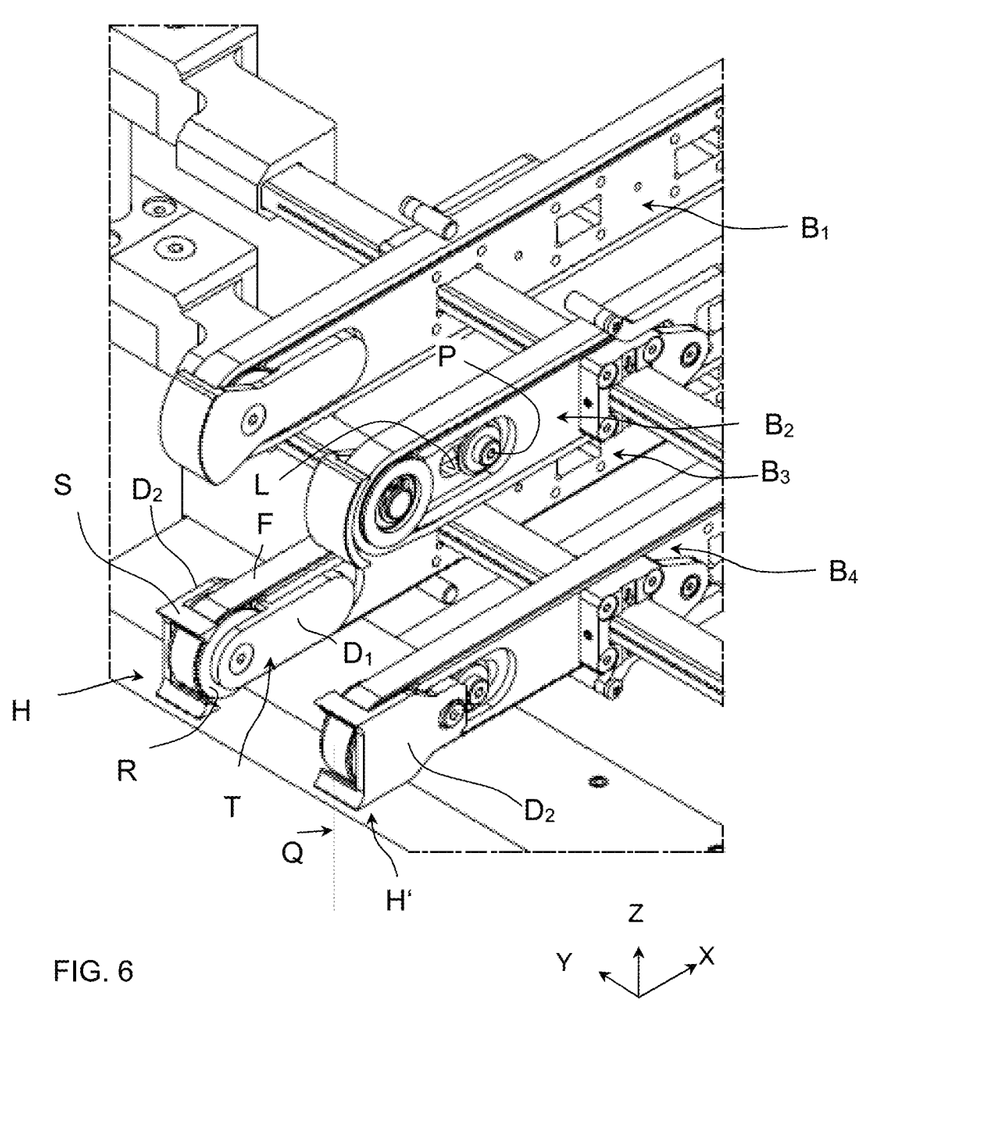
FIG. 6 shows a belt conveyor with one-piece and two-piece contact protection structures.

The bottom section of FIG. 6 shows a partial view of two belt bodies $B_3$, $B_4$, whose contact protection structure H' is formed in two pieces and is thus different to that of FIG. 1 (the two upper belt bodies $B_1$, $B_2$ on the other hand are identical to FIG. 1 in this respect). In the bottom section of FIG. 6 a first retaining section $D_1$, which can be fixed to the frame M, extends on a first side of the roller R towards the rear end of the belt body. However, on this first side of the frame and the roller R this retaining section $D_1$ serves simply as roller holder for the roller R and does not extend beyond the belt end in the X-direction. It forms a first part of the two-piece contact protection structure H'. On the opposite side of the roller R a second retaining section $D_2$, connectable to the first retaining section $D_1$, extends as the second part of the two-piece contact protection structure H' so far beyond the belt radius, that the previously mentioned protective elements $E_1$ can project across the conveyor belt deflected by the roller R, to form the gap G in transverse direction Y. A gap remains between the first retaining section $D_1$ and both protective elements $E_1$ (again see FIG. 5), through which the conveyor belt F could be removed from the roller R in transverse direction Y if necessary.

In this embodiment the second retaining section $D_2$ with the protective elements $E_1$ forming the actual contact protection can be detached from the first retaining section $D_1$ and replaced if necessary. By detaching the first retaining section $D_1$ from the frame M, in addition to the roller R the second retaining section $D_2$ and with it the protective elements $E_1$ forming the actual contact protection can be detached from the belt body together, in order to change the conveyor belt or perform other maintenance tasks, for example. Recommissioning of the belt body is only possible after refitting the roller holder (and the simultaneous arrangement of the contact protection on the belt body).

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, vertical, and the like with reference to a given feature are made with reference to the orientation of the structures shown in the drawings and are not intended to exclude other orientations of the structures.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE SYMBOLS

A Roller axis
$B_1, B_2, B_3, B_4$ Belt body
$D_1, D_2$ Retaining section
$E_1, E_2$ Protective element
F Conveyor belt
G Residual gap
H Contact protection
J Guide surfaces
K Belt conveyor
L Slot
M Frame
N Belt radius
P Shaft
Q Belt end
R Roller
S Supporting surface
T Roller holder
V Connecting means
X Conveying direction
W Stop surface
Y Transverse direction
Z Vertical direction

The invention claimed is:

1. A contact protection apparatus for covering a pinching gap formed adjacent to a conveyor belt of a belt conveyor, the conveyor belt extend along a conveying direction and a transverse direction running orthogonally to the conveying direction and with a vertical direction running orthogonally to both the conveying direction and the transverse direction, the conveyor belt being deflected by a roller which is supported by a belt body of the belt conveyor and which rotates around a roller axis running in the transverse direction, the contact protection apparatus including:
  (a) a roller holder adapted to be placed in a roller holder operating position on the belt body to fix the roller to the belt body;
  (b) a contact protection structure formed in one piece with the roller holder, the contact protection structure covering the pinching gap when the roller holder is placed in the roller holder operating position on the belt body; and
  (c) connection means for fixing the roller holder to the belt body in any one of multiple different locations along the conveying direction to facilitate adjustment of the tension of the conveyor belt.

2. The contact protection apparatus of claim 1 further including a retaining section on which the connection means is located, the retaining section extending laterally next to the roller in conveying direction when the roller holder is in the roller holder operating position.

3. The contact protection apparatus of claim 1 wherein the contact protection structure includes a protective element which, when the roller holder is in the roller holder operating position, extends in the transverse direction to form a radial residual gap of predefinable size with the conveyor belt rotating around the roller.

4. The contact protection apparatus of claim 3 wherein a section of the protective element facing the conveyor belt extends along a circular arc around the roller axis when the roller holder is in the roller holder operating position.

5. The contact protection apparatus of claim 3 wherein the protective element includes a supporting surface extending in the conveying direction and in the transverse direction when the roller holder is in the roller holder operating position so as to form a continuation of a conveying plane formed by the conveyor belt.

6. The contact protection apparatus of claim 3 further including at least one protective element extension module operable to connect to the protective element so as to extend in the transverse direction when the roller holder is in the roller holder operating position.

7. The contact protection apparatus of claim 1:
  (a) further including a retaining section on which the connection means is located, the retaining section extending laterally next to the roller in conveying direction when the roller holder is in the roller holder operating position; and
  (b) wherein the contact protection structure includes a protective element which, when the roller holder is in the roller holder operating position, extends in the transverse direction to form a residual gap of predefinable size with the conveyor belt rotating around the roller; and (c) wherein the protective element, starting from the retaining section, projects freely over the roller to form the residual gap so that the conveyor belt is removable from the belt conveyor on the side of the roller opposite the retaining section.

8. The contact protection apparatus of claim 1 wherein the contact protection structure is symmetrical to a symmetry plane oriented in the conveying direction and transverse direction and containing the roller axis.

9. An apparatus including:
(a) a belt body;
(b) a roller holder connected in a roller holder operating position on the belt body;
(c) a contact protection structure formed in one piece with the roller holder, the contact protection structure covering a pinching gap associated with a roller supported on the belt body by the roller holder; and
(d) connection means for fixing the roller holder to the belt body in any one of multiple different locations along a conveying direction of the belt body to facilitate adjustment of the tension of a conveyor belt mounted on the belt body.

10. The apparatus of claim 9 wherein the roller holder supports the roller on one side.

11. The apparatus of claim 9 wherein the roller has a roller axis extending in a transverse direction orthogonal to the conveying direction of the belt body and the roller holder includes a first positioning surface extending in the transverse direction and engages a second positioning surface of the belt body which also extends in the transverse direction.

12. The apparatus of claim 11 wherein the second positioning surface comprises a recess running in the conveying direction of the belt body.

13. The apparatus of claim 9 wherein the contact protection structure and roller holder are detachable from the belt body in one piece without tools.

\* \* \* \* \*